No. 776,727. PATENTED DEC. 6, 1904.
A. J. COLLAR.
MEANS FOR OPERATING WATER GATES.
APPLICATION FILED APR. 4, 1904.
NO MODEL.
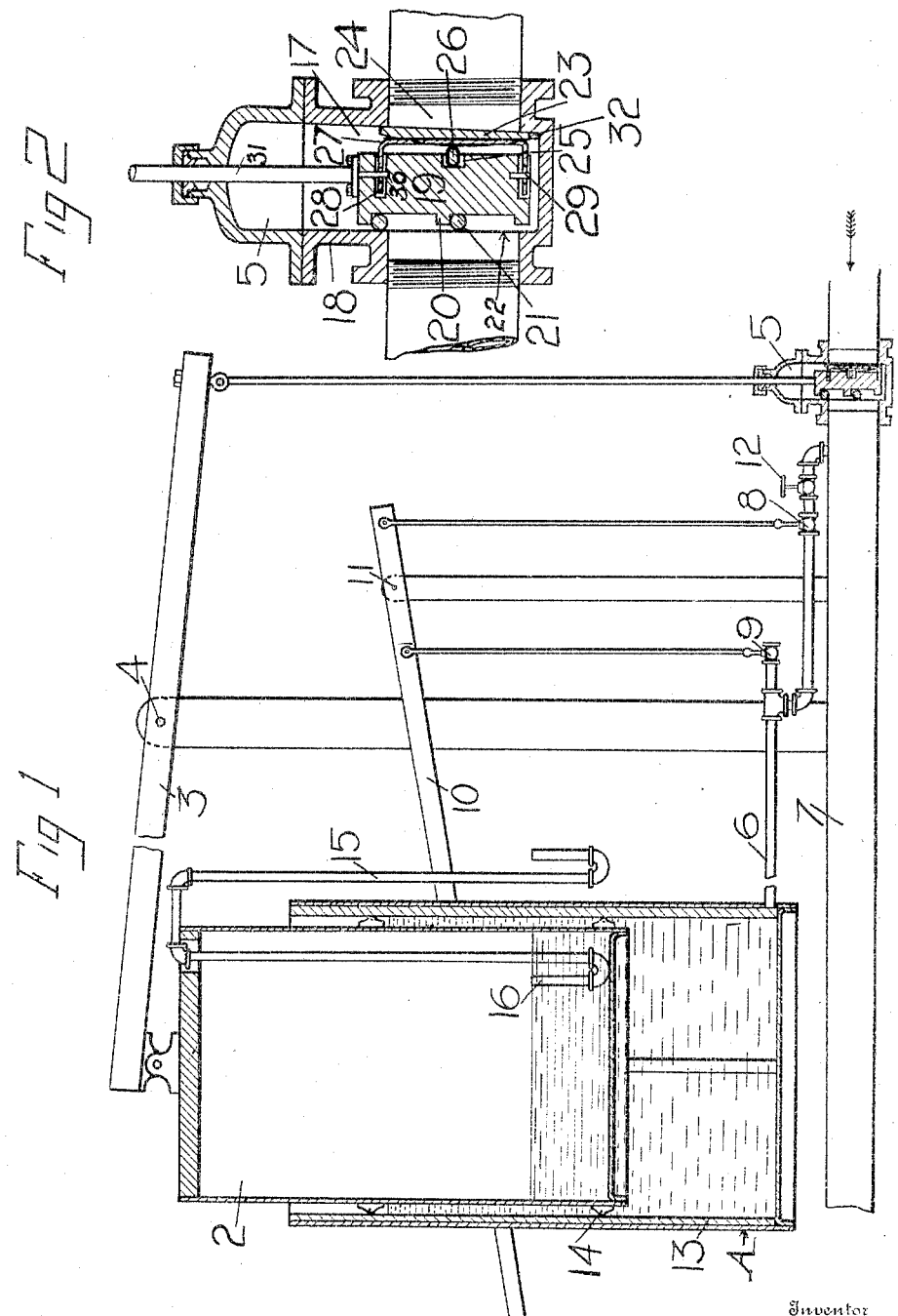
Witnesses
Inventor
Adoniram J. Collar
By Geo. H. Strong
Attorney No. 776,727. Patented December 6, 1904.

UNITED STATES PATENT OFFICE.

ADONIRAM J. COLLAR, OF YREKA, CALIFORNIA.

MEANS FOR OPERATING WATER-GATES.

SPECIFICATION forming part of Letters Patent No. 776,727, dated December 6, 1904.

Application filed April 4, 1904. Serial No. 201,422. (No model.)

*To all whom it may concern:*

Be it known that I, ADONIRAM J. COLLAR, a citizen of the United States, residing at Yreka, in the county of Siskiyou and State of California, have invented new and useful Improvements in Means for Operating Water-Gates, of which the following is a specification.

My invention relates to apparatus for operating water-gates. Its object is to provide a regulator or water-brake for use in conjunction with municipal water-supply systems and the like where the source of supply is situated at some point remote from and above the level of the town and where at times, as in case of a fire or like emergency, an augmented pressure in the main is desired.

The invention consists in the parts and the construction and combination of parts, as hereinafter more fully described, having reference to the accompanying drawings, in which—

Figure 1 is an elevation in partial section of my apparatus. Fig. 2 is a sectional view of my gate.

A represents a tank of suitable size, shape, and material; 2, a float or buoyant vessel adapted to contain water; 3, a lever fulcrumed, as at 4, and supporting float 2 at one end and the valve of gate 5 at the other; 6, a pipe connecting the main 7 below gate 5 with the bottom of tank A; 8 and 9, respectively, inlet and outlet valves in pipe 6; 10, an operating-lever fulcrumed at 11 and connected on either side of its fulcrum with valves 8 9, and 12 a hand-valve by which the flow from main 7 to the tank may be discontinued.

An operation of lever 10 in one direction causes valve 8 to open and valve 9 to close and allow tank A to fill. An actuation of the lever in the opposite direction closes valve 8 and opens valve 9, allowing the tank to empty. Normally lever 10 is thrown to close valve 9 and open valve 8, so that tank A is in constant communication with the main below the gate.

The variations in the water-level in the tank will effect a reciprocation of the float to open or close the valve of gate 5 more or less. Whenever more water is drawn from the distributing system than is passing through gate 5, the level of the water in the tank will fall, causing the gate-valve to open more. If less water is drawn from the system than is passing through gate 5, the back pressure in the main below the gate will raise the water-level in tank A, lifting the float and closing the gate-valve. Thus the normal pressure in the distributing system will depend on the elevation of tank A and not on that of the original source of supply. The reservoir may be situated several hundred feet above the town, while this regulating device is placed at some intermediate point such as will give sufficient pressure in the pipes for all ordinary purposes. Consequently the danger of pipes bursting from the shock due to the sudden turning on or off of water under high head is obviated.

Assuming the maximum capacity of the main to be four hundred inches, ordinarily the consumption of the town may not be over one hundred inches. Gate 5 thus holds in check the main current and lets only enough pass to supply the immediate needs of the place; but in case of unusual emergency, as fire, the gate may be thrown open and the full capacity of the main be instantly available.

Any suitable means may be used to operate lever 10 to close valve 8 and open gate 9, and so allow the tank to be drained of its contents. When the emergency is passed, the lever is again operated to open valve 8 and close valve 9.

The inside of the tank A may be provided with ways or guides 13, on which run rollers 14 on the periphery of the float to steady the latter in its rise and fall.

Where the apparatus is very large, inconvenience might be occasioned by reason of leakage from tank A into float 2, whereupon the latter would lose more or less of its buoyant quality. I provide against such contingency by means of a siphon-tube 15, carried by the float and having one leg inside and reaching to about the bottom of the float and the other hanging outside the float and tank and with both its lower ends turned up, as at 16, to provide a seal and maintain the siphon in constantly-primed condition. The bent-up ends of the siphon terminate at the same level, and this level determines the level of the water in the float. Should it be desired to increase the weight of the float at any time by increasing the depth of water in it, the siphon may be raised and blocked up to the desired height. Conversely, by lowering the ends of the siphon the buoyancy of the float may be increased.

The valve of gate 5 is preferably of the wedge pattern and must be constructed to open and close easily and quickly and at the same time seat securely. As here shown, the valve-casing is provided with a rectangular valve-chamber 17, with its front and rear walls converging slightly toward the bottom, but with the wall 18 on the downstream side approximately vertical to prevent the valve binding. The valve comprises a rectangular body portion 19 with the transverse ribs 20 adjacent to wall 18. These ribs provide that side of the valve with two compartments or recesses, each for the reception of a roller 21. These rollers have a limited movement independent of the valve, and their ends are supported in their traverse of the outlet 22 by the portions of wall 18 on each side of the outlet. The pressure on the valve from the upstream side tends to press the valve hard against the lower wall of the valve-chamber. These rollers offer a suitable antifriction-bearing and render the action of the valve comparatively easy. The intermediate rib on the back of the valve keeps the rollers apart and maintains the balance of the valve. The front or upstream side of the valve carries a loose pivotally-supported plate or disk 23 of greater diameter than the inlet-opening 24 and arranged to seat over this inlet when the valve is closed. This side of the valve is grooved or slotted horizontally, as shown at 25, about opposite the center of the disk, and in this groove is placed a bar 26 with rounded edges, standing edgewise to project beyond the plane of the valve-face and occupying less space than the width of the slot 25. The side of the disk 23 adjacent bar 26 has a vertical ridge 27 and upper and lower perforated lugs 28. The lower lug fits a recess in the bottom of the valve to engage loosely a pin 29, while the upper lug fits a recess in the upper part of the valve and is held loosely in place by a pin 30, carried by the stem 31.

Any suitable means may be employed to fasten the stem to the valve.

32 is a stop cast in the valve-casing below inlet 24 to limit the downward movement of the disk.

In consequence of the foregoing construction the disk is permitted a rocking movement on the fulcrum-bar and a limited up-and-down movement independent of the valve-block, while the fulcrum-bar being held loose in its slot 25 is capable of a certain toggle-joint movement to allow the valve-block to rise and loosen before the disk moves from its seat.

Having thus described my invention, what I claim, and desire to secure by Letters Patent, is—

1. The combination with a main and a gate-valve therein of a tank, connections between the tank and main, a valve controlling the inlet to said tank, a valve controlling the outlet therefrom, means for operating said valves, a float in said tank, and connections between the float and gate-valve whereby the latter is operated synchronously with the movements of the float.

2. The combination with a main and a gate-valve therein of a tank, connections between the tank and main below the gate, a float in said tank, and a lever having one end connected with said float and the other with the gate-valve.

3. The combination with a main and a gate-valve therein of a tank, connections between the tank and main below the gate, a float in said tank, a lever having one end connected with said float and the other with the gate-valve, an inlet-control valve in said connections between the tank and main, a valve controlling the outlet from the tank, and means for operating said valves synchronously.

4. The combination with a main and a gate-valve, of a tank, means for effecting a variation of the water-level in the tank, a buoyant vessel therein, connections between said buoyant vessel and gate-valve whereby said vessel and valve are given a synchronous movement.

5. The combination with a main and a gate-valve, of a tank, means for effecting a variation of the water-level in the tank, a buoyant vessel therein, connections between said buoyant vessel and gate-valve whereby said vessel and valve are given a synchronous movement, and means for maintaining the water-level in the buoyant vessel at a uniform height.

6. The combination with a main and a gate-valve, of a tank, means for effecting a variation of the water-level in the tank, a buoyant vessel therein, connections between said buoyant vessel and gate-valve whereby said vessel and valve are given a synchronous movement, means for maintaining the water-level in the buoyant vessel at a uniform height, said means including a siphon having one end dependent within the vessel and the other exterior thereto and means for maintaining a water seal in the siphon.

7. The combination in a water-gate of a casing inclosing a valve-chamber, a valve therein, said valve having roller-bearings on one side engaging the walls of the valve-chamber and arranged to bridge the outlet-passage from the chamber, and a tiltable plate on the opposite side of the valve closable over the inlet to said chamber.

8. The combination in a water-gate of a casing inclosing a valve-chamber, a valve therein, said valve having roller-bearings on one side engaging the walls of the valve-chamber and arranged to bridge the outlet-passage from the chamber, a tiltable plate on the opposite side of the valve closable over the inlet to said chamber and a tiltable fulcrum-bar for said plate.

9. The combination in a water-gate of a casing having a rectangular valve-chamber, a valve in said chamber, said valve having a tiltable disk or plate on one side adapted to close over the inlet to the chamber and transverse rollers on the opposite side of and carried by the valve arranged to bridge the outlet from the chamber.

10. The combination in a water-gate of a casing having a rectangular valve-chamber, a valve in said chamber, said valve having a tiltable disk or plate on one side adapted to close over the inlet to the chamber and transverse rollers on the opposite side of and carried by the valve arranged to bridge the outlet from the chamber, said disk or plate having a limited up-and-down movement independent of the valve.

In testimony whereof I have hereunto set my hand in presence of two subscribing witnesses.

ADONIRAM J. COLLAR.

Witnesses:
JOHN H. MAGOFFEY,
GEORGE A. TEBBE.